(12) United States Patent
Lohr et al.

(10) Patent No.: US 8,888,643 B2
(45) Date of Patent: Nov. 18, 2014

(54) CONTINUOUSLY VARIABLE TRANSMISSION

(75) Inventors: Charles B Lohr, Austin, TX (US); Brad Pohl, Leander, TX (US)

(73) Assignee: Fallbrook Intellectual Property Company LLC, Cedar Park, TX (US)

( * ) Notice: Subject to any disclaimer, the term of this patent is extended or adjusted under 35 U.S.C. 154(b) by 223 days.

(21) Appl. No.: 13/288,711

(22) Filed: Nov. 3, 2011

(65) Prior Publication Data

US 2012/0115667 A1 May 10, 2012

Related U.S. Application Data

(60) Provisional application No. 61/412,290, filed on Nov. 10, 2010.

(51) Int. Cl.
- *F16H 15/48* (2006.01)
- *F16H 13/08* (2006.01)
- *F16H 13/04* (2006.01)
- *F16H 15/50* (2006.01)

(52) U.S. Cl.
CPC ........................................ *F16H 15/50* (2013.01)
USPC ............................. 475/189; 475/195; 476/36

(58) Field of Classification Search
USPC ................. 475/183–197; 476/36–58
See application file for complete search history.

(56) References Cited

U.S. PATENT DOCUMENTS

| | | | |
|---|---|---|---|
| 719,595 A | 2/1903 | Huss | |
| 1,121,210 A | 12/1914 | Techel | |
| 1,175,677 A | 3/1916 | Barnes | |
| 1,207,985 A | 12/1916 | Null et al. | |
| 1,380,006 A | 5/1921 | Nielson | |
| 1,390,971 A | 9/1921 | Samain | |
| 1,629,092 A | 5/1924 | Arter et al. | |
| 1,558,222 A | 10/1925 | Beetow | |
| 1,629,902 A | 5/1927 | Arter et al. | |
| 1,686,446 A | 10/1928 | Gilman | |

(Continued)

FOREIGN PATENT DOCUMENTS

| CH | 118064 | 12/1926 |
|---|---|---|
| CN | 1054340 | 9/1991 |

(Continued)

OTHER PUBLICATIONS

Thomassy: An Engineering Approach to Simulating Traction EHL. CVT—Hybrid International Conference Mecc/Maastricht/The Netherlands, Nov. 17-19, 2010, p. 97.

*Primary Examiner* — Tisha Lewis
(74) *Attorney, Agent, or Firm* — Knobbe Martens Olson & Bear LLP

(57) ABSTRACT

Disclosed embodiments are directed to components, subassemblies, systems, and/or methods for continuously variable transmissions (CVT). In one embodiment, a CVT has a number of spherical planets in contact with an idler. Various idler assemblies can be used to facilitate to improve durability, fatigue life, and efficiency of a CVT. In one embodiment, the idler assembly has two rolling elements having contact surfaces that are angled with respect to a longitudinal axis of the CVT. In some embodiments, a bearing is operably coupled between the first and second rolling elements. The bearing is configured to balance axial force between the first and second rolling elements. In one embodiment, the bearing is a ball bearing. In another embodiment, the bearing is an angular contact bearing. In yet other embodiments, needle roller bearings are employed.

12 Claims, 4 Drawing Sheets

(56) References Cited

U.S. PATENT DOCUMENTS

| | | |
|---|---|---|
| 1,774,254 A | 8/1930 | Daukus |
| 1,793,571 A | 2/1931 | Vaughn |
| 1,847,027 A | 2/1932 | Thomsen et al. |
| 1,850,189 A | 3/1932 | Weiss |
| 1,858,696 A | 5/1932 | Weiss |
| 1,865,102 A | 6/1932 | Hayes |
| 1,903,228 A | 3/1933 | Thomson |
| 1,978,439 A | 10/1934 | Sharpe |
| 2,030,203 A | 2/1936 | Gove et al. |
| 2,060,884 A | 11/1936 | Madle |
| 2,086,491 A | 7/1937 | Dodge |
| 2,100,629 A | 11/1937 | Chilton |
| 2,109,845 A | 3/1938 | Madle |
| 2,112,763 A | 3/1938 | Cloudsley |
| 2,134,225 A | 10/1938 | Christiansen |
| 2,152,796 A | 4/1939 | Erban |
| 2,196,064 A | 4/1940 | Erban |
| 2,209,254 A | 7/1940 | Ahnger |
| 2,259,933 A | 10/1941 | Holloway |
| 2,269,434 A | 1/1942 | Brooks |
| 2,325,502 A | 7/1943 | Auguste |
| RE22,761 E | 5/1946 | Wemp |
| 2,461,258 A | 2/1949 | Brooks |
| 2,469,653 A | 5/1949 | Kopp |
| 2,480,968 A | 9/1949 | Ronai |
| 2,586,725 A | 2/1952 | Henry |
| 2,596,538 A | 5/1952 | Dicke |
| 2,597,849 A | 5/1952 | Alfredeen |
| 2,675,713 A | 4/1954 | Acker |
| 2,696,888 A | 12/1954 | Chillson et al. |
| 2,730,904 A | 1/1956 | Rennerfelt |
| 2,748,614 A | 6/1956 | Weisel |
| 2,868,038 A | 1/1959 | Billeter |
| 2,959,070 A | 1/1959 | Flinn |
| 2,873,911 A | 2/1959 | Perrine |
| 2,874,592 A | 2/1959 | Oehrii |
| 2,883,883 A | 4/1959 | Chillson |
| 2,891,213 A | 6/1959 | Kern |
| 2,913,932 A | 11/1959 | Oehru |
| 2,931,234 A | 4/1960 | Hayward |
| 2,931,235 A | 4/1960 | Hayward |
| 3,204,476 A | 4/1960 | Rouverol |
| 2,949,800 A | 8/1960 | Neuschotz |
| 2,959,063 A | 11/1960 | Perry |
| 2,959,972 A | 11/1960 | Madson |
| 2,964,959 A | 12/1960 | Beck |
| 3,008,061 A | 11/1961 | Mims et al. |
| 3,048,056 A | 8/1962 | Wolfram |
| 3,051,020 A | 8/1962 | Hartupee |
| 3,086,704 A | 4/1963 | Hurtt |
| 3,087,348 A | 4/1963 | Kraus |
| 3,154,957 A | 11/1964 | Kashihara |
| 3,163,050 A | 12/1964 | Kraus |
| 3,176,542 A | 4/1965 | Monch |
| 3,184,983 A | 5/1965 | Kraus |
| 3,209,606 A | 10/1965 | Yamamoto |
| 3,211,364 A | 10/1965 | Wentling et al. |
| 3,216,283 A | 11/1965 | General |
| 3,246,531 A | 4/1966 | Kashihara |
| 3,248,960 A | 5/1966 | Schottler |
| 3,273,468 A | 9/1966 | Allen |
| 3,280,646 A | 10/1966 | Lemieux |
| 3,283,614 A * | 11/1966 | Hewko .......................... 475/195 |
| 3,292,443 A | 12/1966 | Felix |
| 3,340,895 A | 9/1967 | Osgood, Jr. et al. |
| 3,407,687 A | 10/1968 | Hayashi |
| 3,440,895 A | 4/1969 | Fellows |
| 3,464,281 A | 9/1969 | Azuma Hiroshi et al. |
| 3,477,315 A | 11/1969 | Macks |
| 3,487,726 A | 1/1970 | Burnett |
| 3,487,727 A | 1/1970 | Gustafsson |
| 3,574,289 A | 4/1971 | Scheiter et al. |
| 3,661,404 A | 5/1972 | Bossaer |
| 3,695,120 A | 10/1972 | Titt |
| 3,707,888 A | 1/1973 | Schottler |
| 3,727,473 A | 4/1973 | Bayer |
| 3,727,474 A | 4/1973 | Fullerton |
| 3,736,803 A | 6/1973 | Horowitz et al. |
| 3,768,715 A | 10/1973 | Tout |
| 3,800,607 A | 4/1974 | Zurcher |
| 3,802,284 A | 4/1974 | Sharpe et al. |
| 3,810,398 A | 5/1974 | Kraus |
| 3,820,416 A | 6/1974 | Kraus |
| 3,866,985 A | 2/1975 | Whitehurst |
| 3,891,235 A | 6/1975 | Shelly |
| 3,934,493 A | 1/1976 | Hillyer |
| 3,954,282 A | 5/1976 | Hege |
| 3,987,681 A | 10/1976 | Keithley et al. |
| 3,996,807 A | 12/1976 | Adams |
| 4,098,146 A | 7/1978 | McLarty |
| 4,103,514 A | 8/1978 | Grosse-Entrup |
| 4,159,653 A | 7/1979 | Koivunen |
| 4,169,609 A | 10/1979 | Zampedro |
| 4,177,683 A | 12/1979 | Moses |
| 4,227,712 A | 10/1980 | Dick |
| 4,314,485 A | 2/1982 | Adams |
| 4,345,486 A | 8/1982 | Olesen |
| 4,369,667 A | 1/1983 | Kemper |
| 4,382,188 A | 5/1983 | Cronin |
| 4,391,156 A | 7/1983 | Tibbals |
| 4,459,873 A | 7/1984 | Black |
| 4,464,952 A | 8/1984 | Stubbs |
| 4,468,984 A | 9/1984 | Castelli et al. |
| 4,494,524 A | 1/1985 | Wagner |
| 4,496,051 A | 1/1985 | Ortner |
| 4,526,255 A | 7/1985 | Hennessey et al. |
| 4,546,673 A | 10/1985 | Shigematsu et al. |
| 4,560,369 A | 12/1985 | Hattori |
| 4,567,781 A | 2/1986 | Russ |
| 4,574,649 A | 3/1986 | Seol |
| 4,585,429 A | 4/1986 | Marier |
| 4,617,838 A | 10/1986 | Anderson |
| 4,630,839 A | 12/1986 | Seol |
| 4,631,469 A | 12/1986 | Tsuboi et al. |
| 4,651,082 A | 3/1987 | Kaneyuki |
| 4,700,581 A | 10/1987 | Tibbals, Jr. |
| 4,713,976 A | 12/1987 | Wilkes |
| 4,717,368 A | 1/1988 | Yamaguchi et al. |
| 4,735,430 A | 4/1988 | Tomkinson |
| 4,738,164 A | 4/1988 | Kaneyuki |
| 4,744,261 A | 5/1988 | Jacobson |
| 4,756,211 A | 7/1988 | Fellows |
| 4,781,663 A | 11/1988 | Reswick |
| 4,838,122 A | 6/1989 | Takamiya et al. |
| 4,856,374 A | 8/1989 | Kreuzer |
| 4,869,130 A | 9/1989 | Wiecko |
| 4,881,925 A | 11/1989 | Hattori |
| 4,900,046 A | 2/1990 | Aranceta-Angoitia |
| 4,909,101 A | 3/1990 | Terry |
| 4,918,344 A | 4/1990 | Chikamori et al. |
| 4,964,312 A | 10/1990 | Kraus |
| 5,006,093 A | 4/1991 | Itoh et al. |
| 5,020,384 A | 6/1991 | Kraus |
| 5,033,322 A | 7/1991 | Nakano |
| 5,037,361 A | 8/1991 | Takahashi |
| 5,044,214 A | 9/1991 | Barber |
| 5,069,655 A | 12/1991 | Schievelbusch |
| 5,099,710 A | 3/1992 | Nakano |
| 5,121,654 A | 6/1992 | Fasce |
| 5,125,677 A | 6/1992 | Ogilvie et al. |
| 5,138,894 A | 8/1992 | Kraus |
| 5,156,412 A | 10/1992 | Meguerditchian |
| 5,230,258 A | 7/1993 | Nakano |
| 5,236,211 A | 8/1993 | Meguerditchian |
| 5,236,403 A | 8/1993 | Schievelbusch |
| 5,267,920 A | 12/1993 | Hibi |
| 5,273,501 A | 12/1993 | Schievelbusch |
| 5,318,486 A | 6/1994 | Lutz |
| 5,319,486 A | 6/1994 | Vogel et al. |
| 5,330,396 A | 7/1994 | Lohr et al. |
| 5,355,749 A | 10/1994 | Obara et al. |
| 5,375,865 A | 12/1994 | Terry, Sr. |
| 5,379,661 A | 1/1995 | Nakano |
| 5,383,677 A | 1/1995 | Thomas |

(56) References Cited

U.S. PATENT DOCUMENTS

| | | |
|---|---|---|
| 5,387,000 A | 2/1995 | Sato |
| 5,401,221 A | 3/1995 | Fellows et al. |
| 5,451,070 A | 9/1995 | Lindsay et al. |
| 5,489,003 A | 2/1996 | Ohyama et al. |
| 5,508,574 A | 4/1996 | Vlock |
| 5,562,564 A | 10/1996 | Folino |
| 5,564,998 A | 10/1996 | Fellows |
| 5,601,301 A | 2/1997 | Liu |
| 5,607,373 A | 3/1997 | Ochiai et al. |
| 5,645,507 A | 7/1997 | Hathaway |
| 5,651,750 A | 7/1997 | Imanishi et al. |
| 5,664,636 A | 9/1997 | Ikuma et al. |
| 5,669,845 A | 9/1997 | Muramoto et al. |
| 5,690,346 A | 11/1997 | Keskitalo |
| 5,722,502 A | 3/1998 | Kubo |
| 5,746,676 A | 5/1998 | Kawase et al. |
| 5,755,303 A | 5/1998 | Yamamoto et al. |
| 5,799,541 A | 9/1998 | Arbeiter |
| 5,823,052 A | 10/1998 | Nobumoto |
| 5,846,155 A | 12/1998 | Taniguchi et al. |
| 5,888,160 A | 3/1999 | Miyata et al. |
| 5,899,827 A | 5/1999 | Nakano et al. |
| 5,902,207 A | 5/1999 | Sugihara |
| 5,967,933 A | 10/1999 | Valdenaire |
| 5,984,826 A | 11/1999 | Nakano |
| 6,000,707 A | 12/1999 | Miller |
| 6,004,239 A | 12/1999 | Makino |
| 6,006,151 A | 12/1999 | Graf |
| 6,015,359 A | 1/2000 | Kunii |
| 6,019,701 A | 2/2000 | Mori et al. |
| 6,029,990 A | 2/2000 | Busby |
| 6,042,132 A | 3/2000 | Suenaga et al. |
| 6,045,477 A | 4/2000 | Schmidt |
| 6,045,481 A | 4/2000 | Kumagai |
| 6,053,833 A | 4/2000 | Masaki |
| 6,053,841 A | 4/2000 | Kolde et al. |
| 6,054,844 A | 4/2000 | Frank |
| 6,066,067 A | 5/2000 | Greenwood |
| 6,071,210 A | 6/2000 | Kato |
| 6,076,846 A | 6/2000 | Clardy |
| 6,079,726 A | 6/2000 | Busby |
| 6,095,940 A | 8/2000 | Ai et al. |
| 6,099,431 A | 8/2000 | Hoge et al. |
| 6,113,513 A | 9/2000 | Itoh et al. |
| 6,119,539 A | 9/2000 | Papanicolaou |
| 6,119,800 A | 9/2000 | McComber |
| 6,159,126 A | 12/2000 | Oshidan |
| 6,171,210 B1 | 1/2001 | Miyata et al. |
| 6,174,260 B1 | 1/2001 | Tsukada et al. |
| 6,186,922 B1 | 2/2001 | Bursal et al. |
| 6,217,473 B1 | 4/2001 | Ueda et al. |
| 6,241,636 B1 | 6/2001 | Miller |
| 6,243,638 B1 | 6/2001 | Abo et al. |
| 6,251,038 B1 | 6/2001 | Ishikawa et al. |
| 6,258,003 B1 | 7/2001 | Hirano et al. |
| 6,261,200 B1 | 7/2001 | Miyata et al. |
| 6,311,113 B1 | 10/2001 | Danz et al. |
| 6,312,358 B1 | 11/2001 | Goi et al. |
| 6,322,475 B2 | 11/2001 | Miller |
| 6,325,386 B1 | 12/2001 | Shoge |
| 6,358,178 B1 | 3/2002 | Wittkopp |
| 6,375,412 B1 | 4/2002 | Dial |
| 6,390,945 B1 | 5/2002 | Young |
| 6,390,946 B1 | 5/2002 | Hibi et al. |
| 6,406,399 B1 | 6/2002 | Ai |
| 6,414,401 B1 | 7/2002 | Kuroda et al. |
| 6,419,608 B1 | 7/2002 | Miller |
| 6,425,838 B1 | 7/2002 | Matsubara et al. |
| 6,434,960 B1 | 8/2002 | Rousseau |
| 6,440,037 B2 | 8/2002 | Takagi et al. |
| 6,461,268 B1 | 10/2002 | Milner |
| 6,482,094 B2 | 11/2002 | Kefes |
| 6,492,785 B1 | 12/2002 | Kasten et al. |
| 6,494,805 B2 | 12/2002 | Ooyama et al. |
| 6,499,373 B2 | 12/2002 | Van Cor |
| 6,514,175 B2 | 2/2003 | Taniguchi et al. |
| 6,532,890 B2 | 3/2003 | Chen |
| 6,551,210 B2 | 4/2003 | Miller |
| 6,575,047 B2 | 6/2003 | Reik et al. |
| 6,659,901 B2 | 12/2003 | Sakai et al. |
| 6,672,418 B1 | 1/2004 | Makino |
| 6,676,559 B2 | 1/2004 | Miller |
| 6,679,109 B2 | 1/2004 | Gierling et al. |
| 6,682,432 B1 | 1/2004 | Shinozuka |
| 6,689,012 B2 | 2/2004 | Miller |
| 6,721,637 B2 | 4/2004 | Abe et al. |
| 6,723,016 B2 | 4/2004 | Sumi |
| 6,805,654 B2 | 10/2004 | Nishii |
| 6,839,617 B2 | 1/2005 | Mensler et al. |
| 6,849,020 B2 | 2/2005 | Sumi |
| 6,859,709 B2 | 2/2005 | Joe et al. |
| 6,931,316 B2 | 8/2005 | Joe et al. |
| 6,932,739 B2 | 8/2005 | Miyata et al. |
| 6,942,593 B2 | 9/2005 | Nishii et al. |
| 6,945,903 B2 | 9/2005 | Miller |
| 6,949,049 B2 | 9/2005 | Miller |
| 6,958,029 B2 | 10/2005 | Inoue |
| 6,991,575 B2 | 1/2006 | Inoue |
| 6,991,579 B2 | 1/2006 | Kobayashi et al. |
| 7,011,600 B2 | 3/2006 | Miller et al. |
| 7,011,601 B2 | 3/2006 | Miller |
| 7,014,591 B2 | 3/2006 | Miller |
| 7,029,418 B2 | 4/2006 | Taketsuna et al. |
| 7,032,914 B2 | 4/2006 | Miller |
| 7,036,620 B2 | 5/2006 | Miller et al. |
| 7,044,884 B2 | 5/2006 | Miller |
| 7,063,640 B2 | 6/2006 | Miller |
| 7,074,007 B2 | 7/2006 | Miller |
| 7,074,154 B2 | 7/2006 | Miller |
| 7,074,155 B2 | 7/2006 | Miller |
| 7,077,777 B2 | 7/2006 | Miyata et al. |
| 7,086,979 B2 | 8/2006 | Frenken |
| 7,086,981 B2 | 8/2006 | Ali et al. |
| 7,094,171 B2 | 8/2006 | Inoue |
| 7,111,860 B1 | 9/2006 | Grimaldos |
| 7,112,158 B2 | 9/2006 | Miller |
| 7,112,159 B2 | 9/2006 | Miller et al. |
| 7,125,297 B2 | 10/2006 | Miller et al. |
| 7,131,930 B2 | 11/2006 | Miller et al. |
| 7,140,999 B2 | 11/2006 | Miller |
| 7,147,586 B2 | 12/2006 | Miller et al. |
| 7,153,233 B2 | 12/2006 | Miller et al. |
| 7,156,770 B2 | 1/2007 | Miller |
| 7,160,220 B2 | 1/2007 | Shinojima et al. |
| 7,160,222 B2 | 1/2007 | Miller |
| 7,163,485 B2 | 1/2007 | Miller |
| 7,163,486 B2 | 1/2007 | Miller et al. |
| 7,166,052 B2 | 1/2007 | Miller et al. |
| 7,166,056 B2 | 1/2007 | Miller et al. |
| 7,166,057 B2 | 1/2007 | Miller et al. |
| 7,166,058 B2 | 1/2007 | Miller et al. |
| 7,169,076 B2 | 1/2007 | Miller et al. |
| 7,172,529 B2 | 2/2007 | Miller et al. |
| 7,175,564 B2 | 2/2007 | Miller |
| 7,175,565 B2 | 2/2007 | Miller et al. |
| 7,175,566 B2 | 2/2007 | Miller et al. |
| 7,192,381 B2 | 3/2007 | Miller et al. |
| 7,197,915 B2 | 4/2007 | Luh et al. |
| 7,198,582 B2 | 4/2007 | Miller et al. |
| 7,198,583 B2 | 4/2007 | Miller et al. |
| 7,198,584 B2 | 4/2007 | Miller et al. |
| 7,198,585 B2 | 4/2007 | Miller et al. |
| 7,201,693 B2 | 4/2007 | Miller et al. |
| 7,201,694 B2 | 4/2007 | Miller et al. |
| 7,201,695 B2 | 4/2007 | Miller et al. |
| 7,204,777 B2 | 4/2007 | Miller et al. |
| 7,214,159 B2 | 5/2007 | Miller et al. |
| 7,217,215 B2 | 5/2007 | Miller et al. |
| 7,217,216 B2 | 5/2007 | Inoue |
| 7,217,219 B2 | 5/2007 | Miller |
| 7,217,220 B2 | 5/2007 | Careau et al. |
| 7,232,395 B2 | 6/2007 | Miller et al. |
| 7,234,873 B2 | 6/2007 | Kato et al. |
| 7,235,031 B2 | 6/2007 | Miller et al. |

(56) References Cited

U.S. PATENT DOCUMENTS

| | | | |
|---|---|---|---|
| 7,238,136 B2 | 7/2007 | Miller et al. |
| 7,238,137 B2 | 7/2007 | Miller et al. |
| 7,238,138 B2 | 7/2007 | Miller et al. |
| 7,238,139 B2 | 7/2007 | Roethler et al. |
| 7,246,672 B2 | 7/2007 | Shirai et al. |
| 7,250,018 B2 | 7/2007 | Miller et al. |
| 7,261,663 B2 | 8/2007 | Miller et al. |
| 7,275,610 B2 | 10/2007 | Kuang et al. |
| 7,285,068 B2 | 10/2007 | Hosoi |
| 7,288,042 B2 | 10/2007 | Miller et al. |
| 7,288,043 B2 | 10/2007 | Shioiri et al. |
| 7,320,660 B2 | 1/2008 | Miller |
| 7,322,901 B2 | 1/2008 | Miller et al. |
| 7,343,236 B2 | 3/2008 | Wilson |
| 7,347,801 B2 | 3/2008 | Guenter et al. |
| 7,384,370 B2 | 6/2008 | Miller |
| 7,393,300 B2 | 7/2008 | Miller et al. |
| 7,393,302 B2 | 7/2008 | Miller |
| 7,393,303 B2 | 7/2008 | Miller |
| 7,395,731 B2 | 7/2008 | Miller et al. |
| 7,396,209 B2 | 7/2008 | Miller et al. |
| 7,402,122 B2 | 7/2008 | Miller |
| 7,410,443 B2 | 8/2008 | Miller |
| 7,419,451 B2 | 9/2008 | Miller |
| 7,422,541 B2 | 9/2008 | Miller |
| 7,422,546 B2 | 9/2008 | Miller et al. |
| 7,427,253 B2 | 9/2008 | Miller |
| 7,431,677 B2 | 10/2008 | Miller et al. |
| 7,452,297 B2 | 11/2008 | Miller et al. |
| 7,455,611 B2 | 11/2008 | Miller et al. |
| 7,455,617 B2 | 11/2008 | Miller et al. |
| 7,462,123 B2 | 12/2008 | Miller et al. |
| 7,462,127 B2 | 12/2008 | Miller et al. |
| 7,470,210 B2 | 12/2008 | Miller et al. |
| 7,481,736 B2 | 1/2009 | Miller et al. |
| 7,510,499 B2 | 3/2009 | Miller et al. |
| 7,540,818 B2 | 6/2009 | Miller et al. |
| 7,547,264 B2 | 6/2009 | Usoro |
| 7,574,935 B2 | 8/2009 | Rohs et al. |
| 7,591,755 B2 | 9/2009 | Petrzik et al. |
| 7,632,203 B2 | 12/2009 | Miller |
| 7,651,437 B2 | 1/2010 | Miller et al. |
| 7,654,928 B2 | 2/2010 | Miller et al. |
| 7,670,243 B2 | 3/2010 | Miller |
| 7,686,729 B2 | 3/2010 | Miller et al. |
| 7,727,101 B2 | 6/2010 | Miller |
| 7,727,107 B2 | 6/2010 | Miller |
| 7,727,108 B2 | 6/2010 | Miller et al. |
| 7,727,110 B2 | 6/2010 | Miller et al. |
| 7,727,115 B2 | 6/2010 | Serkh |
| 7,731,615 B2 | 6/2010 | Miller et al. |
| 7,762,919 B2 | 7/2010 | Smithson et al. |
| 7,762,920 B2 | 7/2010 | Smithson et al. |
| 7,785,228 B2 | 8/2010 | Smithson et al. |
| 7,828,685 B2 | 11/2010 | Miller |
| 7,837,592 B2 | 11/2010 | Miller |
| 7,871,353 B2 | 1/2011 | Nichols et al. |
| 7,882,762 B2 | 2/2011 | Armstrong et al. |
| 7,883,442 B2 | 2/2011 | Miller et al. |
| 7,885,747 B2 | 2/2011 | Miller et al. |
| 7,887,032 B2 | 2/2011 | Malone |
| 7,909,723 B2 * | 3/2011 | Triller et al. ............. 475/189 |
| 7,909,727 B2 | 3/2011 | Smithson et al. |
| 7,914,029 B2 | 3/2011 | Miller et al. |
| 7,959,533 B2 | 6/2011 | Nichols et al. |
| 7,963,880 B2 | 6/2011 | Smithson et al. |
| 7,967,719 B2 | 6/2011 | Smithson et al. |
| 7,976,426 B2 | 7/2011 | Smithson et al. |
| 8,066,613 B2 | 11/2011 | Smithson et al. |
| 8,066,614 B2 | 11/2011 | Miller et al. |
| 8,070,635 B2 | 12/2011 | Miller |
| 8,087,482 B2 | 1/2012 | Miles et al. |
| 8,123,653 B2 | 2/2012 | Smithson et al. |
| 8,133,149 B2 | 3/2012 | Smithson et al. |
| 8,142,323 B2 | 3/2012 | Tsuchiya et al. |
| 8,167,759 B2 | 5/2012 | Pohl et al. |
| 8,171,636 B2 | 5/2012 | Smithson et al. |
| 8,262,536 B2 | 9/2012 | Nichols et al. |
| 8,313,404 B2 | 11/2012 | Carter et al. |
| 8,313,405 B2 | 11/2012 | Bazyn et al. |
| 8,317,651 B2 | 11/2012 | Lohr |
| 8,321,097 B2 | 11/2012 | Vasiliotis et al. |
| 8,342,999 B2 | 1/2013 | Miller |
| 8,360,917 B2 | 1/2013 | Nichols et al. |
| 8,376,903 B2 | 2/2013 | Pohl et al. |
| 8,382,637 B2 | 2/2013 | Tange |
| 8,393,989 B2 | 3/2013 | Pohl |
| 8,469,853 B2 | 6/2013 | Miller et al. |
| 8,480,529 B2 | 7/2013 | Pohl et al. |
| 8,496,554 B2 | 7/2013 | Pohl et al. |
| 8,506,452 B2 | 8/2013 | Pohl et al. |
| 8,512,195 B2 * | 8/2013 | Lohr et al. .............. 475/189 |
| 8,550,949 B2 | 10/2013 | Miller |
| 8,585,528 B2 | 11/2013 | Carter et al. |
| 8,622,866 B2 | 1/2014 | Bazyn et al. |
| 8,626,409 B2 | 1/2014 | Vasiliotis et al. |
| 8,628,443 B2 | 1/2014 | Miller et al. |
| 8,641,572 B2 | 2/2014 | Nichols et al. |
| 8,641,577 B2 | 2/2014 | Nichols et al. |
| 8,721,485 B2 | 5/2014 | Lohr et al. |
| 2001/0008192 A1 | 7/2001 | Morisawa |
| 2001/0041644 A1 | 11/2001 | Yasuoka et al. |
| 2001/0044361 A1 | 11/2001 | Taniguchi et al. |
| 2002/0019285 A1 | 2/2002 | Henzler |
| 2002/0028722 A1 | 3/2002 | Sakai et al. |
| 2002/0045511 A1 | 4/2002 | Geiberger et al. |
| 2002/0169051 A1 | 11/2002 | Oshidari |
| 2003/0015358 A1 | 1/2003 | Abe et al. |
| 2003/0015874 A1 | 1/2003 | Abe et al. |
| 2003/0022753 A1 | 1/2003 | Mizuno et al. |
| 2003/0036456 A1 | 2/2003 | Skrabs |
| 2003/0132051 A1 | 7/2003 | Nishii et al. |
| 2003/0216216 A1 | 11/2003 | Inoue et al. |
| 2003/0221892 A1 | 12/2003 | Matsumoto et al. |
| 2004/0038772 A1 | 2/2004 | McIndoe et al. |
| 2004/0058772 A1 | 3/2004 | Inoue et al. |
| 2004/0067816 A1 | 4/2004 | Taketsuna et al. |
| 2004/0082421 A1 | 4/2004 | Wafzig |
| 2004/0119345 A1 | 6/2004 | Takano |
| 2004/0171457 A1 | 9/2004 | Fuller |
| 2004/0204283 A1 | 10/2004 | Inoue |
| 2004/0231331 A1 | 11/2004 | Iwanami et al. |
| 2004/0254047 A1 | 12/2004 | Frank et al. |
| 2005/0037876 A1 | 2/2005 | Unno et al. |
| 2005/0085338 A1 | 4/2005 | Miller et al. |
| 2005/0227809 A1 | 10/2005 | Bitzer et al. |
| 2006/0052204 A1 | 3/2006 | Eckert et al. |
| 2006/0084549 A1 | 4/2006 | Smithson et al. |
| 2006/0108956 A1 | 5/2006 | Clark |
| 2006/0111212 A9 | 5/2006 | Ai et al. |
| 2006/0180363 A1 | 8/2006 | Uchisasai |
| 2006/0223667 A1 | 10/2006 | Nakazeki |
| 2006/0234822 A1 | 10/2006 | Morscheck et al. |
| 2006/0276299 A1 | 12/2006 | Imanishi |
| 2007/0004552 A1 | 1/2007 | Matsudaira et al. |
| 2007/0004556 A1 | 1/2007 | Rohs et al. |
| 2007/0149342 A1 | 6/2007 | Guenter et al. |
| 2007/0155567 A1 | 7/2007 | Miller et al. |
| 2007/0155580 A1 * | 7/2007 | Nichols et al. ............ 476/36 |
| 2007/0193391 A1 | 8/2007 | Armstrong et al. |
| 2008/0032852 A1 | 2/2008 | Smithson et al. |
| 2008/0032854 A1 | 2/2008 | Smithson et al. |
| 2008/0039269 A1 | 2/2008 | Smithson et al. |
| 2008/0039273 A1 | 2/2008 | Smithson et al. |
| 2008/0039276 A1 | 2/2008 | Smithson et al. |
| 2008/0081728 A1 | 4/2008 | Faulring et al. |
| 2008/0139363 A1 | 6/2008 | Williams |
| 2008/0141809 A1 | 6/2008 | Miller et al. |
| 2008/0149407 A1 | 6/2008 | Shibata et al. |
| 2008/0200300 A1 | 8/2008 | Smithson et al. |
| 2008/0228362 A1 | 9/2008 | Muller et al. |
| 2008/0236319 A1 | 10/2008 | Nichols et al. |
| 2008/0261771 A1 | 10/2008 | Nichols et al. |
| 2008/0284170 A1 | 11/2008 | Cory |

(56) References Cited

U.S. PATENT DOCUMENTS

| | | | |
|---|---|---|---|
| 2008/0305920 A1 | 12/2008 | Nishii et al. | |
| 2009/0023545 A1 | 1/2009 | Beaudoin | |
| 2009/0082169 A1 | 3/2009 | Kolstrup | |
| 2009/0107454 A1 | 4/2009 | Hiyoshi et al. | |
| 2009/0164076 A1 | 6/2009 | Vasiliotis et al. | |
| 2009/0251013 A1 | 10/2009 | Vollmer et al. | |
| 2009/0280949 A1 | 11/2009 | Lohr | |
| 2009/0312145 A1 | 12/2009 | Pohl et al. | |
| 2010/0056322 A1 | 3/2010 | Thomassy | |
| 2010/0093479 A1 | 4/2010 | Carter et al. | |
| 2010/0093485 A1 | 4/2010 | Pohl et al. | |
| 2010/0131164 A1 | 5/2010 | Carter et al. | |
| 2010/0267510 A1* | 10/2010 | Nichols et al. | 475/189 |
| 2011/0088503 A1 | 4/2011 | Armstrong et al. | |
| 2011/0105274 A1 | 5/2011 | Lohr et al. | |
| 2011/0127096 A1 | 6/2011 | Schneidewind | |
| 2011/0172050 A1 | 7/2011 | Nichols et al. | |
| 2011/0184614 A1 | 7/2011 | Keilers et al. | |
| 2011/0218072 A1 | 9/2011 | Lohr et al. | |
| 2011/0230297 A1 | 9/2011 | Shiina et al. | |
| 2011/0291507 A1 | 12/2011 | Post | |
| 2011/0319222 A1 | 12/2011 | Ogawa et al. | |
| 2012/0035015 A1 | 2/2012 | Ogawa et al. | |
| 2012/0035016 A1 | 2/2012 | Miller et al. | |
| 2012/0043841 A1 | 2/2012 | Miller | |
| 2012/0258839 A1 | 10/2012 | Smithson et al. | |
| 2013/0035200 A1 | 2/2013 | Noji et al. | |
| 2013/0053211 A1 | 2/2013 | Fukuda et al. | |
| 2013/0079191 A1 | 3/2013 | Lohr | |
| 2013/0095977 A1 | 4/2013 | Smithson et al. | |
| 2013/0102434 A1 | 4/2013 | Nichols et al. | |
| 2013/0146406 A1 | 6/2013 | Nichols et al. | |
| 2013/0152715 A1 | 6/2013 | Pohl et al. | |
| 2013/0190123 A1 | 7/2013 | Pohl et al. | |
| 2013/0190125 A1 | 7/2013 | Nichols et al. | |
| 2013/0288844 A1 | 10/2013 | Thomassy | |
| 2013/0288848 A1 | 10/2013 | Carter et al. | |
| 2013/0310214 A1 | 11/2013 | Pohl et al. | |
| 2013/0324344 A1 | 12/2013 | Pohl et al. | |
| 2013/0337971 A1 | 12/2013 | Kostrup | |
| 2014/0011619 A1 | 1/2014 | Pohl et al. | |
| 2014/0011628 A1 | 1/2014 | Lohr et al. | |
| 2014/0038771 A1 | 2/2014 | Miller | |
| 2014/0073470 A1 | 3/2014 | Carter et al. | |
| 2014/0121922 A1 | 5/2014 | Vasiliotis et al. | |
| 2014/0128195 A1 | 5/2014 | Miller et al. | |
| 2014/0141919 A1 | 5/2014 | Bazyn et al. | |
| 2014/0144260 A1 | 5/2014 | Nichols et al. | |
| 2014/0148303 A1 | 5/2014 | Nichols et al. | |

FOREIGN PATENT DOCUMENTS

| | | |
|---|---|---|
| CN | 1157379 A | 8/1997 |
| CN | 1281540 A | 1/2001 |
| CN | 1283258 | 2/2001 |
| CN | 1940348 A | 4/2007 |
| DE | 498 701 | 5/1930 |
| DE | 1171692 | 6/1964 |
| DE | 2 310 880 | 9/1974 |
| DE | 2 136 243 | 1/1975 |
| DE | 2436496 | 2/1975 |
| DE | 39 40 919 A1 | 6/1991 |
| DE | 19851738 A | 5/2000 |
| DE | 10155372 A1 | 5/2003 |
| EP | 0 432 742 | 12/1990 |
| EP | 0528382 | 2/1993 |
| EP | 635639 A1 | 1/1995 |
| EP | 0638741 | 2/1995 |
| EP | 0976956 | 2/2000 |
| EP | 1136724 | 9/2001 |
| EP | 1366978 | 3/2003 |
| EP | 1 433 641 | 6/2004 |
| EP | 1 624 230 | 2/2006 |
| EP | 1 811 202 | 7/2007 |
| FR | 620375 | 4/1927 |
| FR | 2590638 | 5/1987 |
| GB | 391448 | 4/1933 |
| GB | 592320 | 9/1947 |
| GB | 906 002 A | 9/1962 |
| GB | 919430 A | 2/1963 |
| GB | 1132473 | 11/1968 |
| GB | 1165545 | 10/1969 |
| GB | 1 376 057 | 12/1974 |
| GB | 2031822 | 4/1980 |
| GB | 2 035 482 | 6/1980 |
| GB | 2 080 452 | 8/1982 |
| JP | 42-2843 | 2/1942 |
| JP | 44-1098 | 1/1944 |
| JP | 42-2844 | 2/1967 |
| JP | 547-000448 | 7/1972 |
| JP | 47-29762 | 11/1972 |
| JP | 48-54371 | 7/1973 |
| JP | 49-12742 | 3/1974 |
| JP | 50-114581 | 9/1975 |
| JP | 51-25903 | 8/1976 |
| JP | 51-150380 | 12/1976 |
| JP | 47-20535 | 8/1977 |
| JP | 53 048166 | 1/1978 |
| JP | 55-135259 | 4/1979 |
| JP | A-S56-127852 | 10/1981 |
| JP | 58065361 | 4/1983 |
| JP | 59069565 | 4/1984 |
| JP | 59-144826 | 8/1984 |
| JP | 60-247011 | 12/1985 |
| JP | 61-031754 | 2/1986 |
| JP | 61-144466 | 7/1986 |
| JP | 61-173722 | 10/1986 |
| JP | 61-270552 | 11/1986 |
| JP | 62-075170 | 4/1987 |
| JP | 63-219953 | 9/1988 |
| JP | 63219953 | 9/1988 |
| JP | 63-160465 | 10/1988 |
| JP | 01-286750 | 11/1989 |
| JP | 01-308142 | 12/1989 |
| JP | 02-130224 | 5/1990 |
| JP | 02157483 | 6/1990 |
| JP | 02271142 | 6/1990 |
| JP | 04-166619 | 6/1992 |
| JP | 04-272553 | 9/1992 |
| JP | 4-351361 | 12/1992 |
| JP | 5-87154 | 4/1993 |
| JP | 52-35481 | 9/1993 |
| JP | 6-50358 | 2/1994 |
| JP | 7-42799 | 2/1995 |
| JP | 7-139600 | 5/1995 |
| JP | 08170706 A | 7/1996 |
| JP | 09024743 A | 1/1997 |
| JP | 09-089064 | 3/1997 |
| JP | 10-061739 | 3/1998 |
| JP | 10-115355 | 5/1998 |
| JP | 10-115356 | 5/1998 |
| JP | 10-194186 | 7/1998 |
| JP | 411063130 | 3/1999 |
| JP | 11-257479 | 9/1999 |
| JP | 2000-46135 | 2/2000 |
| JP | 2001-27298 | 1/2001 |
| JP | 2001-107827 | 4/2001 |
| JP | 2001-165296 | 6/2001 |
| JP | 2001521109 A | 11/2001 |
| JP | 2002-147558 | 5/2002 |
| JP | 2002-250421 | 6/2002 |
| JP | 2002-307956 | 10/2002 |
| JP | 2003-028257 | 1/2003 |
| JP | 2003-56662 | 2/2003 |
| JP | 2003-161357 | 6/2003 |
| JP | 2003-524119 | 8/2003 |
| JP | 2003-336732 | 11/2003 |
| JP | 2004162652 A | 6/2004 |
| JP | 8-247245 | 9/2004 |
| JP | 2004-526917 | 9/2004 |
| JP | 2005-003063 | 1/2005 |
| JP | 2005/240928 A | 9/2005 |
| JP | 2006015025 | 1/2006 |

(56) References Cited

FOREIGN PATENT DOCUMENTS

| | | |
|---|---|---|
| JP | 2006-300241 | 11/2006 |
| JP | 2007-535715 | 12/2007 |
| JP | 2008-002687 | 1/2008 |
| JP | 03-149442 | 1/2009 |
| JP | 2010069005 | 4/2010 |
| NE | 98467 | 7/1961 |
| TW | 74007 | 1/1984 |
| TW | 175100 | 12/1991 |
| TW | 218909 | 1/1994 |
| TW | 227206 | 7/1994 |
| TW | 360184 | 6/1999 |
| TW | 366396 | 8/1999 |
| TW | 512211 | 12/2002 |
| TW | 582363 | 4/2004 |
| TW | 590955 | 6/2004 |
| TW | I225129 | 12/2004 |
| TW | I225912 | 1/2005 |
| TW | I235214 | 1/2005 |
| TW | 200637745 A | 11/2006 |
| WO | WO 99/20918 | 4/1999 |
| WO | WO 01/73319 | 10/2001 |
| WO | WO 03100294 | 12/2003 |
| WO | WO 2005/083305 | 9/2005 |
| WO | WO 2005/108825 | 11/2005 |
| WO | WO 2006/091503 | 8/2006 |
| WO | WO 2007/077502 | 7/2007 |
| WO | WO 2008/002457 | 1/2008 |
| WO | WO 2008/057507 | 5/2008 |
| WO | WO 2008/078047 | 7/2008 |
| WO | WO 2008/095116 | 8/2008 |
| WO | WO 2008/100792 | 8/2008 |
| WO | WO 2008/101070 | 8/2008 |
| WO | WO 2008/131353 | 10/2008 |
| WO | WO 2008/154437 | 12/2008 |
| WO | WO 2009/006481 | 1/2009 |
| WO | WO 2009/148461 | 12/2009 |
| WO | WO 2009/157920 | 12/2009 |
| WO | WO 2010/017242 | 2/2010 |
| WO | WO 2010/135407 | 11/2010 |
| WO | WO 2011/101991 | 8/2011 |
| WO | WO 2013/112408 A1 | 8/2013 |

\* cited by examiner

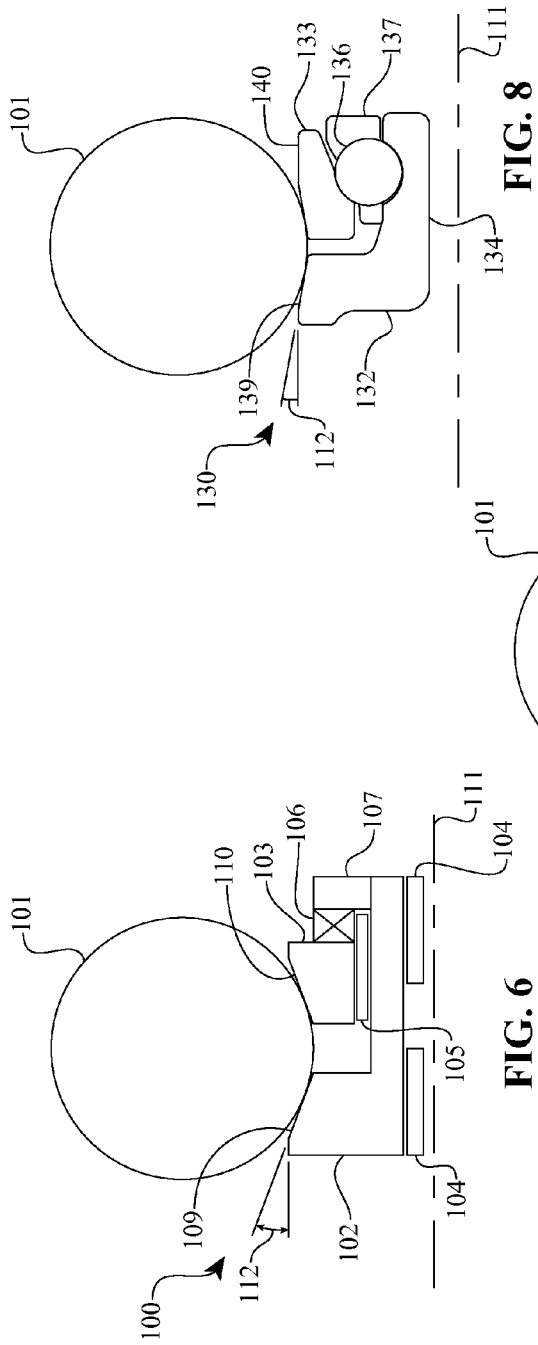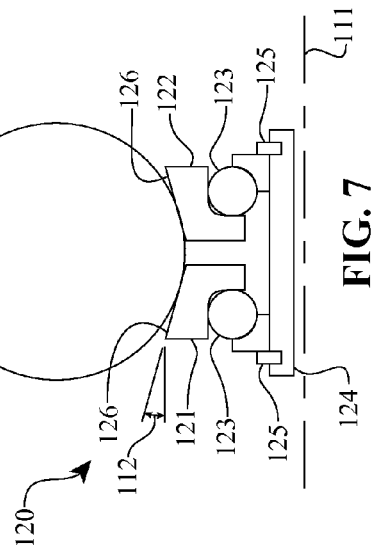

CONTINUOUSLY VARIABLE TRANSMISSION

RELATED APPLICATION

This application claims the benefit of U.S. Provisional Application No. 61/412,290, filed on Nov. 10, 2010, which is hereby incorporated by reference in its entirety.

BACKGROUND

1. Field of the Invention

This disclosure relates generally to mechanical and/or electro-mechanical power modulation devices and methods. More particularly, this disclosure relates to continuously and/or infinitely variable, planetary power modulating devices, and methods for modulating power flow in a power train or drive, such as power flow from a prime mover to one or more auxiliary or driven devices.

2. Description of the Related Art

Continuously variable transmissions (CVT) having spherical planets such as those generally described in U.S. Pat. No. 7,011,600 to Miller et al, U.S. Pat. No. 5,236,403 to Schievelbusch, or U.S. Pat. No. 2,469,653 to Kopp, typically have a rotatable support member or an idler component in contact with each spherical planet. In some systems, the idler is a generally cylindrical member located radially inward of each spherical planet. During operation of these types of CVTs, the spherical planets exert forces on the idler that generate high stress at the location contacting the spherical planets. The type of stress is commonly known as a hertzian contact stress. Fatigue life and/or durability of a rolling element, such as an idler, is a function of the hertzian stress exerted on the rolling element over time. High stress exerted on the idler component leads to lower fatigue life and lower efficiency performance of the CVT.

Thus, there exists a continuing need for devices and methods to improve the fatigue life of idler components. Embodiments of power modulating devices and/or drivetrains described below address one or more of these needs.

SUMMARY OF THE INVENTION

The systems and methods herein described have several features, no single one of which is solely responsible for its desirable attributes. Without limiting the scope as expressed by the claims that follow, its more prominent features will now be discussed briefly. After considering this discussion, and particularly after reading the section entitled "Detailed Description of Certain Embodiments" one will understand how the features of the system and methods provide several advantages over traditional systems and methods.

One aspect of the disclosure relates to a continuously variable transmission (CVT) having a longitudinal axis. In one embodiment, the CVT includes a group of spherical traction planets. Each traction planet has an axle about which it rotates. The axle is configured to tilt with respect to the longitudinal axis. The CVT includes an idler assembly in contact with each of the traction planets. In one embodiment, the idler assembly is located radially inward of each of the traction planets. The idler assembly has first and second rolling elements. The first and second rolling elements are configured to rotate at different speeds corresponding to the tilt of the traction planets.

Another aspect of the disclosure relates to a continuously variable transmission (CVT) having a group of traction planet assemblies arranged angularly about a longitudinal axis of the CVT. In one embodiment, the CVT includes a first carrier coupled to the each of the traction planet assemblies. The first carrier is provided with a number of radially offset slots. The first carrier is configured to guide the traction planet assemblies. The CVT also includes an idler assembly in contact with each of the traction planets. The idler assembly is located radially inward of each traction planet. The idler assembly has first and second rolling elements.

Yet another aspect of the disclosure relates to a continuously variable accessory drive system (CVAD). In one embodiment, the CVAD has a shaft arranged along a longitudinal axis of the CVAD. The CVAD includes a first traction ring coaxial about the longitudinal axis. The CVAD also includes a group of traction planets in contact with the first traction ring. The traction planets are arranged angularly about the longitudinal axis. In one embodiment, the CVAD includes a carrier operably coupled to the each of the traction planets. The carrier is provided with a number of radially offset guide slots. The CVAD also includes an idler assembly in contact with each of the traction planets. The idler assembly is located radially inward of each traction planet. The idler assembly has first and second rolling elements. The CVAD includes an alternator coupled to the shaft.

One aspect of the invention relates to an idler assembly for a continuously variable transmission (CVT) having a group of traction planet assemblies arranged about a longitudinal axis. Each traction planet assembly is operably coupled to a carrier having a number of radially offset guide slots. In one embodiment, the idler assembly includes first and second rolling elements in contact with each traction planet assembly. The first and second rolling elements are located radially inward of each traction planet assembly. The idler assembly also includes a bearing operably coupling the first rolling element to the second rolling element. The bearing is configured to balance axial force between the first and second rolling elements.

BRIEF DESCRIPTION OF THE FIGURES

FIG. 6 is a diagram of one embodiment of an idler assembly that can be used with the CVAD of FIG. 1.

FIG. 7 is a diagram of one embodiment of an idler assembly that can be used with the CVAD of FIG. 1.

FIG. 8 is a diagram of one embodiment of an idler assembly that can be used with the CVAD of FIG. 1.

DETAILED DESCRIPTION OF CERTAIN EMBODIMENTS

Figure 1:
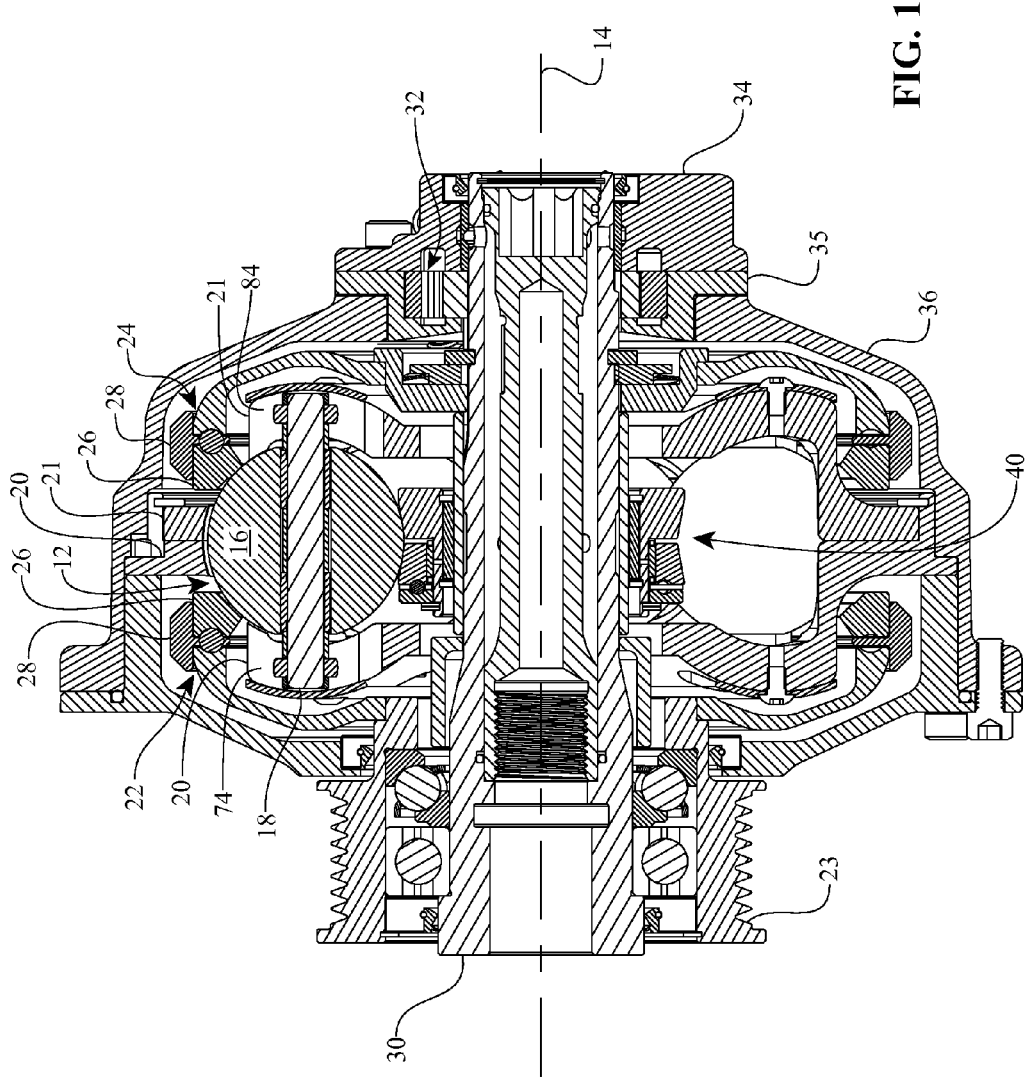
FIG. 1 is a cross-sectional view of an embodiment of a continuously variable accessory drive (CVAD) having a skew control system.

The preferred embodiments will be described now with reference to the accompanying figures, wherein like numerals refer to like elements throughout. The terminology used in the descriptions below is not to be interpreted in any limited or restrictive manner simply because it is used in conjunction with detailed descriptions of certain specific embodiments. Furthermore, embodiments of the disclosure can include several novel features, no single one of which is solely responsible for its desirable attributes or which is essential to practicing the embodiments described. Certain CVT embodiments described here are generally related to the type disclosed in U.S. Pat. Nos. 6,241,636; 6,419,608; 6,689,012; 7,011,600; 7,166,052; U.S. patent application Ser. Nos. 11/243,484; 11/543,311; 12/198,402, 12/251,325; and Patent Cooperation Treaty patent applications PCT/US2007/023315, PCT/IB2006/054911, PCT/US2008/068929, and PCT/US2007/023315, PCT/US2008/074496. The entire disclosures of each of these patents and patent applications are hereby incorporated herein by reference.

As used here, the terms "operationally connected," "operationally coupled," "operationally linked," "operably connected," "operably coupled," "operably linked," and like terms, refer to a relationship (mechanical, linkage, coupling, etc.) between elements whereby operation of one element results in a corresponding, following, or simultaneous operation or actuation of a second element. It is noted that in using said terms to describe certain embodiments, specific structures or mechanisms that link or couple the elements are typically described. However, unless otherwise specifically stated, when one of said terms is used, the term indicates that the actual linkage or coupling may take a variety of forms, which in certain instances will be readily apparent to a person of ordinary skill in the relevant technology. For description purposes, the term "axial" as used here refers to a direction or position along an axis that is parallel to a main or longitudinal axis of a transmission or variator. The term "radial" is used here to indicate a direction or position that is perpendicular relative to a longitudinal axis of a transmission or variator.

It should be noted that reference herein to "traction" does not exclude applications where the dominant or exclusive mode of power transfer is through "friction." Without attempting to establish a categorical difference between traction and friction drives here, generally these may be understood as different regimes of power transfer. Traction drives usually involve the transfer of power between two elements by shear forces in a thin fluid layer trapped between the elements. The fluids used in these applications usually exhibit traction coefficients greater than conventional mineral oils. The traction coefficient ($\mu$) represents the maximum available traction forces which would be available at the interfaces of the contacting components and is a measure of the maximum available drive torque. Typically, friction drives generally relate to transferring power between two elements by frictional forces between the elements. For the purposes of this disclosure, it should be understood that the CVTs described here may operate in both tractive and frictional applications. For example, in the embodiment where a CVT is used for a bicycle application, the CVT can operate at times as a friction drive and at other times as a traction drive, depending on the torque and speed conditions present during operation.

Embodiments disclosed here are related to the control of a variator and/or a CVT using generally spherical planets each having a tiltable axis of rotation that can be adjusted to achieve a desired ratio of input speed to output speed during operation. In some embodiments, adjustment of said axis of rotation involves angular displacement of the planet axis in a first plane in order to achieve an angular adjustment of the planet axis in a second plane, wherein the second plane is substantially perpendicular to the first plane. The angular displacement in the first plane is referred to here as "skew," "skew angle," and/or "skew condition". For discussion purposes, the first plane is generally parallel to a longitudinal axis of the variator and/or the CVT. The second plane can be generally perpendicular to the longitudinal axis. In one embodiment, a control system coordinates the use of a skew angle to generate forces between certain contacting components in the variator that will tilt the planet axis of rotation substantially in the second plane. The tilting of the planet axis of rotation adjusts the speed ratio of the variator. The aforementioned skew angle, or skew condition, can be applied in a plane substantially perpendicular to the plane of the page of FIG. 1, for example. Embodiments of transmissions employing certain skew control systems for attaining a desired speed ratio of a variator will be discussed.

One aspect of the torque/speed regulating devices disclosed here relates to drive systems wherein a prime mover drives various driven devices. In this sense, regulating is used to mean varying the transmission ratio to vary the torque or speed of the power being provided to the accessory to correspond with the operating requirements of the accessory being driven from the CVT. The prime mover can be, for example, an electrical motor and/or an internal combustion engine. For purposes of description here, an accessory includes any machine or device that can be powered by a prime mover. For purposes of illustration and not limitation, said machine or device can be a power takeoff device (PTO), pump, compressor, generator, auxiliary electric motor, etc. Accessory devices configured to be driven by a prime mover may also include alternators, water pumps, power steering pumps, fuel pumps, oil pumps, air conditioning compressors, cooling fans, superchargers, turbochargers and any other device that is typically powered by an automobile engine. As previously stated, usually, the speed of a prime mover varies as the speed or power requirements change; however, in many cases the accessories operate optimally at a given, substantially constant speed. Embodiments of the torque/speed regulating devices disclosed here can be used to control the speed of the power delivered to the accessories powered by a prime mover.

For example, in some embodiments, the speed regulators disclosed here can be used to control the speed of automotive accessories driven by a pulley attached to the crankshaft of an automotive engine. Usually, accessories must perform suitably both when the engine idles at low speed and when the engine runs at high speed. Often accessories operate optimally at one speed and suffer from reduced efficiency at other speeds. Additionally, the accessory design is compromised by the need to perform over a large speed range rather than an optimized narrow speed range. In many cases when the engine runs at a speed other than low speed, accessories consume excess power and, thereby, reduce vehicle fuel economy. The power drain caused by the accessories also reduces the engine's ability to power the vehicle, necessitating a larger engine in some cases.

In other situations, inventive embodiments of the torque/speed regulating devices disclosed here can be used to decrease or increase speed and/or torque delivered to the accessories for achieving optimal system performance. In certain situations, embodiments of the torque/speed regulating devices disclosed here can be used to increase speed to the accessories when the prime mover runs at low speed and to decrease speed to the accessories when the prime mover runs at high speed. Thus, the design and operation of accessories can be optimized by allowing the accessories to operate at one, substantially favorable speed, and the accessories need not be made larger than necessary to provide sufficient performance at low speeds. For example, the embodiments of the torque/speed regulating devices disclosed here can enable more power to be extracted from an accessory such as an alternator when the prime mover or engine is running at low idle speed. The accessories can also be made smaller because the torque/speed regulating devices can reduce speed to the accessories when the prime mover runs at high speed, reducing the stress load the accessories must withstand at high rpm. Because the accessories are not subjected to high speeds, their expected service life can increase substantially. In some cases, smoother vehicle operation results because the accessories do not have to run at low or high speed. Further, a vehicle can operate more quietly at high speed because the accessories run at a lower speed.

Embodiments of a continuously variable transmission (CVT), and components and subassemblies thereof, will be described now with reference to FIGS. 1-8. FIG. 1 shows a CVT 10 that can be used in many applications including, but not limited to, continuously variable accessory drives, human powered vehicles (for example, bicycles), light electrical vehicles, hybrid human-, electric-, or internal combustion powered vehicles, industrial equipment, wind turbines, etc. Any technical application that requires modulation of mechanical power transfer between a power input and a power sink (for example, a load) can implement embodiments of the CVT 10 in its power train.

Figures 2, 3:
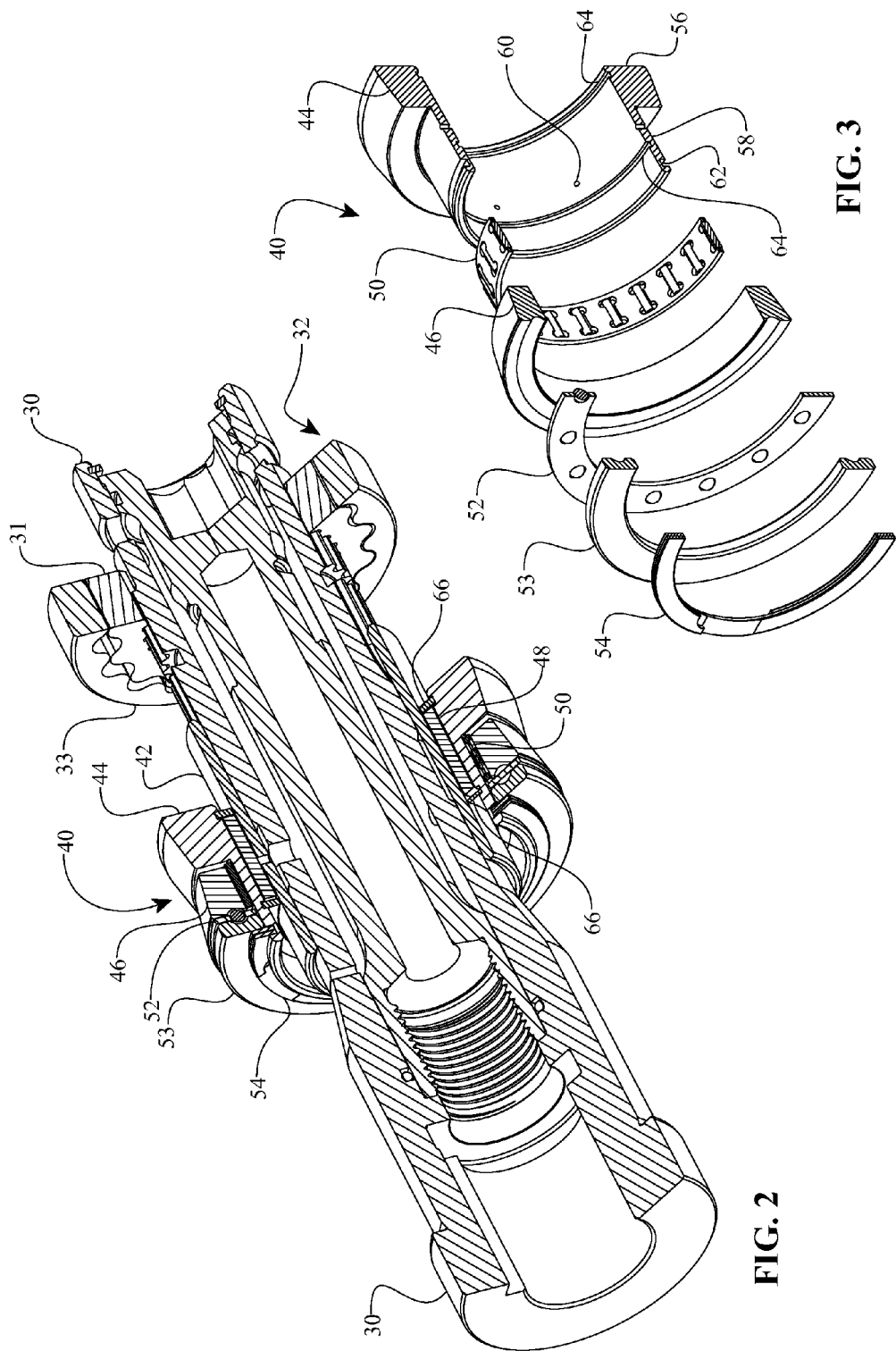
FIG. 2 is a partially cross-sectional perspective view of certain components of the CVAD of FIG. 1.
FIG. 3 is a cross-sectional exploded view of an idler assembly that can be used with the CVAD of FIG. 1.

Referring now to FIGS. 1-3, in one embodiment the CVT 10 is provided with a number of traction planet assemblies 12 arranged radially about a longitudinal axis 14. Each traction planet assembly 12 includes a spherical traction planet 16 configured to rotate about a planet axle 18. The planet axle 18 can tilt with respect to the longitudinal axis 14. Ends of the planet axle 18 can be coupled to first and second carriers 20, 21. In one embodiment, the first and second carriers 20, 21 are adapted to rotate with respect to each other. The CVT 10 can be provided with a first traction ring assembly 22 in contact with each of the traction planets 16. In one embodiment, the first traction ring assembly 22 is adapted to receive a power input from a drive pulley 23. The CVT 10 can be provided with a second traction ring assembly 24 in contact with each of the traction planets 16. In one embodiment, the first and second traction ring assemblies 22, 24 are each provided with a traction ring 26 and an axial force generator assembly 28. In some embodiments, the axial force generator assembly 28 can include a tone wheel configured to cooperate with, for example, a speed sensor (not shown). The CVT 10 is provided with a shaft 30 arranged along the longitudinal axis 14. The shaft 30 can be configured to transfer power to an accessory (not shown), such as an alternator. The shaft 30 is configured to drive, among other things, a pump 32. In one embodiment, the pump 32 is a gerotor type pump having an inner driven gear 31 coupled to an outer gear 33. The inner driven gear 31 is coupled to the shaft 30. The pump 32 is in fluid communication with a lubricant manifold 34. The lubricant manifold 34 is attached to a pump cavity 35. The pump cavity 35 and the lubricant manifold 34 substantially enclose the pump 32. The pump cavity 35 is coupled to a housing 36. The housing 36 substantially encloses and supports components of the CVT 10. The lubricant manifold 34, the pump cavity 35, and the shaft 30 are provided with a number of passages that are appropriately arranged to introduce a lubricant from a reservoir (not shown) into the pump 32 and deliver the lubricant to internal components of the CVT 10. In one embodiment, the reservoir is integral with the housing 36. In some embodiments, the reservoir can be remotely located.

In one embodiment, the CVT 10 is provided with an idler assembly 40 arranged radially inward of, and in contact with, each of the traction planets 16. The idler assembly 40 couples to a sleeve 42. The sleeve 42 is coaxial with, and surrounds, the shaft 30. In some embodiments, the sleeve 42 can be integral to the shaft 30. The sleeve 42 can be made of a different material than the shaft 30. For example, the sleeve 42 can be made of a material that has properties appropriate for a bearing race or a journal. In one embodiment, the idler assembly 40 includes a first rolling element 44 operably coupled to a second rolling element 46. The first rolling element 44 is radially supported on the sleeve 42 by a bearing 48. The bearing 48 can be a needle roller bearing, for example. The second rolling element 46 is radially supported by a bearing 50. The bearing 50 can be a needle roller bearing, for example. The second rolling element 46 is supported in the axial direction by a bearing 52. The bearing 52 can be a ball bearing, for example. The bearing 52 is coupled to a race 53. The race 53 is attached to the first rolling element 44 with, for example, a clip 54. The bearing 52 is positioned in a manner to balance the axial force applied to the first rolling element 44 with the axial force applied to the second rolling element 46.

During operation of the CVT 10, the first and second rolling elements 44, 46 rotate about the longitudinal axis 14. The first and second rolling elements 44, 46 each rotate at a speed corresponding to the tilt angle of the planet axle 18 with respect to the longitudinal axle 14. Under some operating conditions, for example when the planet axle 18 is substantially parallel to the longitudinal axis 14, the speed of the first rolling element 44 is substantially equal to the speed of the second rolling element 46. Under other operating conditions, the speed of the first rolling element 44 can be higher than the speed of the second rolling element 46. Under yet other operating conditions, the speed of the first rolling element 44 can be lower than the speed of the second rolling element 46. During operation of the CVT 10, the difference in speed between the first and second rolling elements 44, 46 is transmitted to the bearing 52. This is advantageous since the speed difference between the first and second rolling elements 44, 46 is typically small. It is well known that parasitic losses from bearings are related to the speed and load at which a bearing operates. Since the bearing 52 typically operates under relatively high axial loads, reducing the speed at which the bearing 52 operates serves to reduce the parasitic loss of the bearing 52.

Referring now specifically to FIG. 3, in one embodiment the first rolling element 44 is a generally cylindrical body having a ring 56 formed on one end. The first rolling element 44 is provided with a shoulder 58 extending from the ring 56. The shoulder 58 has a number of holes 60 arranged radially about the circumference of the cylindrical body. The holes 60 can facilitate the flow of lubricant to, for example, the bearing 50. In some embodiments, the holes 60 facilitate the flow of lubricant to the contacting surfaces between the traction planets 16 and the first and second rolling elements 44, 46. The shoulder 58 is provided with a groove 62 formed on the outer periphery of the cylindrical body. The groove 62 is adapted to receive the clip 54. The first rolling element 44 is provided with grooves 64 on the inner circumference of the cylindrical body. The grooves 64 are adapted to receive, for example, clips 66 (FIG. 2). The clips 66 facilitate the retention of the bearing 48 (FIG. 2) with respect to the first rolling element 44.

Figures 4, 5:
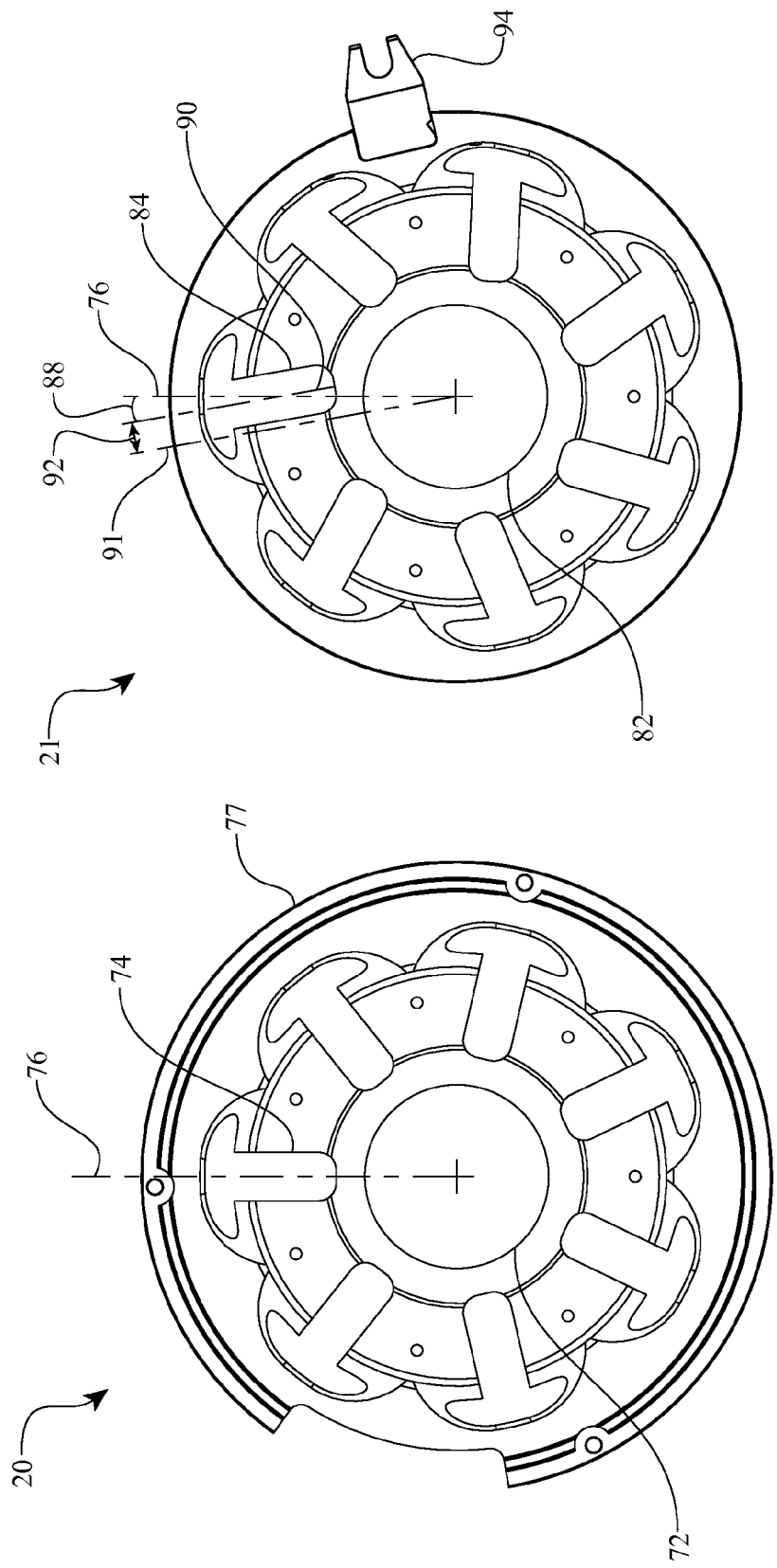
FIG. 4 is a plan view of a carrier that can be used with the CVAD of FIG. 1.
FIG. 5 is a plan view of a carrier that can be used with the CVAD of FIG. 1.

Turning now to FIG. 4, in one embodiment the first carrier 20 is a substantially bowl-shaped body having a central bore 72. The bowl-shaped body can be provided with a number of guide slots 74 arranged angularly about the central bore 72. The guide slots 74 are aligned with a radial construction line 76 when viewed in the plane of the page of FIG. 4. The guide slots 74 are adapted to receive one end of the planet axle 18. The bowl-shaped body is provided with a flange 77 formed about the outer periphery. The flange 77 can be adapted to attach to the housing 36.

Referring now to FIG. 5, in one embodiment the second carrier 21 is a substantially bowl-shaped body having a central bore 82. The bowl-shaped body can be provided with a number of guide slots 84 arranged angularly about the central bore 82. Each guide slot 84 is sized to accommodate the coupling of the second carrier 21 to the planet axle 18. The guide slots 84 are angularly offset from the radial construction line 76 when viewed in the plane of the page of FIG. 5. The angular offset can be approximated by an angle 88. The angle 88 is formed between the radial construction line 76 and a construction line 90. The construction line 90 substantially bisects the guide slot 84 when viewed in the plane of the page of FIG. 5. In some embodiments, the angle 88 is between 3 degrees and 45 degrees. A low angle 88 would provide faster shift rates in a given application but rotation of the carrier 21 must be controlled over a very small range. A high angle 88 would provide slower shift rates in a given application but rotation of carrier 21 would be controlled over a larger range. In effect, a low angle 88 produces a highly responsive transmission ratio change but potentially more difficult to control or stabilize, while a high angle can be less responsive in transmission ratio change but easy to control by comparison. In some embodiments, where it is desirable to have high speed, fast shift rates, the angle 88 can be, for example, 10 degrees. In other embodiments, where it is desirable to have slower speed, precise control of transmission ratio, the angle 88 can be about 30 degrees. However, the said values of the angle 88 are provided as an illustrative example, and the angle 88 can be varied in any manner a designer desires. In some embodiments, the angle 88 can be any angle in the range of 10 to 25 degrees including any angle in between or fractions thereof. For example, the angle can be 10, 11, 12, 13, 14, 15, 16, 17, 18, 19, 20, 21, 22, 23, 24, 25, or any portion thereof. In other embodiments, the angle 88 can be 20 degrees. In one embodiment, the guide slots 84 can be arranged so that the construction line 90 is radially offset from a construction line 91 by a distance 92. The construction line 91 is parallel to the construction line 90 and intersects the center of the bowl-shaped body.

In one embodiment, the second carrier 21 is coupled to a clevis 94. The clevis 94 can be accessed through an opening (not shown) in the housing 36 to facilitate the coupling of the clevis 94 to an actuator (not shown). During operation of the CVT 10, a change in transmission ratio can be accomplished by rotating the second carrier 21 with respect to the first carrier 20. A rotation of the second carrier 21 can be accomplished by moving the clevis 94 with the actuator.

Referring now to FIG. 6, in one embodiment an idler assembly 100 includes a spherical traction planet 101. The spherical traction planet 101 can be provided with a tiltable axis of rotation (not shown). The idler assembly 100 includes first and second rolling elements 102, 103, respectively. In some embodiments, the first rolling element 102 can be coupled to at least one bearing 104 at a radially inward location. In other embodiments, the bearing 104 is not used. The second rolling element 103 can be coupled to at least one bearing 105 at a radially inward location. The bearing 105 is supported by the first rolling element 102. The second rolling element 103 can be axially coupled to the first rolling element 102 with a bearing 106. In some embodiments, the bearing 106 can be an angular contact bearing, in such cases the bearing 105 can be removed. The bearing 106 is coupled to a shoulder 107 attached to the first rolling element 102. In one embodiment, the shoulder 107 is integral to the first rolling element 102. In other embodiments, the shoulder 107 is a separate component that is fixedly attached to the first rolling element 102. Each of the first and second rolling elements 102, 103 are provided with contact surfaces 109, 110, respectively. The contact surfaces 109, 110 are in contact with the traction planet 101. The contact surfaces 109, 110 are angled with respect to a longitudinal axis 111 at an angle 112 when viewed in the plane of the page of FIG. 6. In some embodiments, the angle 112 can be any angle in the range of 0 to 45 degrees including any angle in between or fractions thereof. For example, the angle can be 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45 or any portion thereof. In other embodiments, the angle 112 can be 10 degrees. In some embodiments, the first rolling element 102 is configured to receive an input power.

Passing now to FIG. 7, in one embodiment an idler assembly 120 can include first and second rolling elements 121, 122, respectively. The first and second rolling elements 121, 122 are each coupled to a bearing 123. The bearings 123 can be attached to a sleeve 124 with, for example, clips 125. The first and second rolling elements 121, 122 are each provided with a contact surface 126. The contact surfaces 126 are in contact with the traction planet 101. The contact surfaces 126 are formed at the angle 112 relative to the longitudinal axis 111 when viewed in the plane of the page of FIG. 7.

Referring now to FIG. 8, in one embodiment an idler assembly 130 can include first and second rolling elements 132, 133, respectively. The first and second rolling elements 132, 133 are each coupling to a bearing 136. The bearing 136 can be provided with a cage 137. The first rolling element 132 has an extension 134. The extension 134 coupled to the bearing 136. In one embodiment, the bearing 136 is an angular contact bearing. The first rolling element 132 is provided with a contact surface 139. The contact surface 139 is in contact with the traction planet 101. The second rolling element 133 is provided with a contact surface 140. The contact surfaces 139, 140 are formed at the angle 112 relative to the longitudinal axis 111 when viewed in the plane of the page of FIG. 8.

It should be noted that the description above has provided dimensions for certain components or subassemblies. The mentioned dimensions, or ranges of dimensions, are provided in order to comply as best as possible with certain legal requirements, such as best mode. However, the scope of the embodiments described herein are to be determined solely by the language of the claims, and consequently, none of the mentioned dimensions is to be considered limiting on the embodiments, except in so far as any one claim makes a specified dimension, or range of thereof, a feature of the claim.

The foregoing description details certain embodiments of the disclosure. It will be appreciated, however, that no matter how detailed the foregoing appears in text, the disclosure can be practiced in many ways. As is also stated above, it should be noted that the use of particular terminology when describing certain features or aspects of the disclosure should not be taken to imply that the terminology is being re-defined herein to be restricted to including any specific characteristics of the features or aspects of the disclosure with which that terminology is associated.

What we claim is:

1. A continuously variable transmission (CVT) having a longitudinal axis, the CVT comprising:
   a plurality of traction planet assemblies arranged angularly about the longitudinal axis;
   a first carrier coupled to the each of the traction planet assemblies, the first carrier having a plurality of radially offset slots, the first carrier configured to guide the traction planet assemblies;
   an idler assembly in contact with each of the traction planets, the idler assembly located radially inward of each traction planet, the idler assembly having first and second rolling elements, wherein the first rolling element is provided with an extension configured to radially support the second rolling element, and wherein a contact surface on the first rolling element and a contact surface on the second rolling element are angled at an angle between 5 and 45 degrees with respect to the longitudinal axis of the CVT; and a bearing configured to support the first and second rolling elements.

2. The CVT of claim 1, wherein the contact surfaces are angled between 7 degree angles and 15 degree angles with respect to the longitudinal axis.

3. The CVT of claim 1, wherein the bearing is a ball bearing.

4. A continuously variable accessory drive system (CVAD) having a longitudinal axis, the CVAD comprising:
    a shaft arranged along the longitudinal axis;
    a first traction ring coaxial with the longitudinal axis;
    a plurality of traction planets in contact with the first traction ring, the traction planets arranged angularly about the longitudinal axis;
    a carrier operably coupled to the each of the traction planets, the carrier having a plurality of radially offset guide slots;
    an idler assembly in contact with each of the traction planets, the idler assembly located radially inward of each traction planet, the idler assembly having first and second rolling elements, wherein a contact surface on the first rolling element and a contact surface on the second rolling element are angled at an angle between 5 and 45 degrees with respect to the longitudinal axis of the CVAD;
    a needle bearing coupled to a shaft sleeve and the first rolling element, the needle bearing axially constrained to the first rolling element; and
    an alternator coupled to the shaft.

5. The CVAD of claim 4, further comprising the shaft sleeve located radially inward of the idler assembly, the shaft sleeve rotatably mounted on the shaft.

6. The CVAD of claim 4, wherein the contact surfaces are angled at between 7 and 15 degree angles with respect to the longitudinal axis.

7. An idler assembly for a continuously variable transmission (CVT) having a plurality of traction planet assemblies arranged about a longitudinal axis, each traction planet assembly operably coupled to a carrier having a plurality of radially offset guide slots, the idler assembly comprising:
    first and second rolling elements in contact with each traction planet assembly, the first and second rolling elements located radially inward of each traction planet assembly, wherein the first rolling element is provided with an extension adapted to radially support the second rolling element; and
    a bearing operably coupling the first rolling element to the second rolling element, the bearing configured to balance axial force between the first and second rolling elements.

8. The idler assembly of claim 7, wherein the first and second rolling elements are each provided with an angular contact surface.

9. The idler assembly of claim 8, wherein the angular contact surfaces are at an angle between 5 degrees and 45 degrees with respect to the longitudinal axis.

10. The idler assembly of claim 9, wherein the angular contact surfaces are angled at between 7 and 15 degree angles with respect to the longitudinal axis.

11. The idler assembly of claim 9, further comprising a needle bearing located radially inward of the second rolling element, the needle bearing coupled to the extension of the first rolling element.

12. The idler assembly of claim 7, wherein the bearing is an angular contact bearing.

* * * * *